Figure 1:
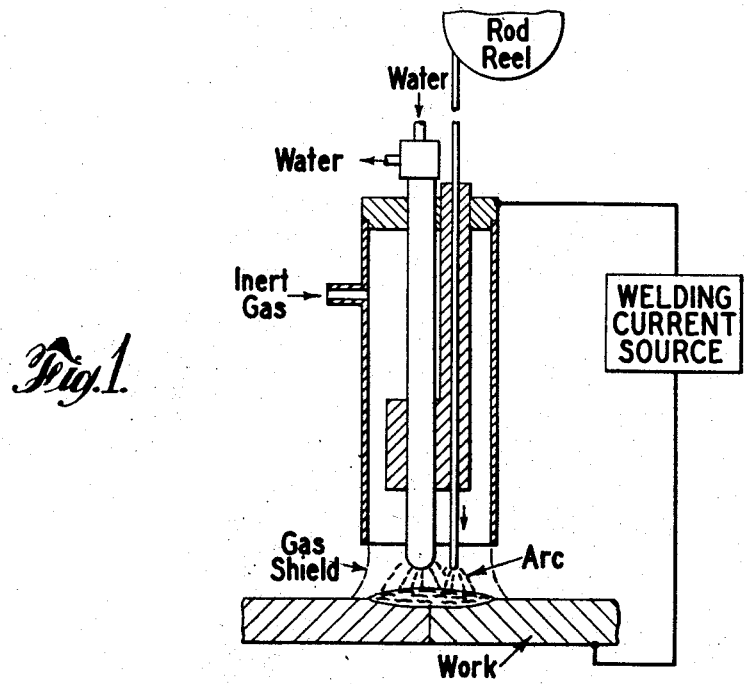

INVENTORS
GEORGE M. SKINNER
DONALD W. ROTH

United States Patent Office 2,868,954
Patented Jan. 13, 1959

2,868,954

GAS SHIELDED MULTI-ARC WELDING

George M. Skinner and Donald W. Roth, Kenmore, N. Y., assignors to Union Carbide Corporation, a corporation of New York Application January 10, 1955, Serial No. 480,722

13 Claims. (Cl. 219—130)

This invention relates to gas shielded multi-arc welding, and more particularly to a process of this character employing a non-consumable electrode and a consumable electrode shielded by the same gas stream.

In inert gas shielded metal arc welding known as the sigma process, it has been difficult to control the wire melt off rate, particularly for the straight polarity welding of steel, which is characterized by excessive build-up of weld metal without sufficient penetration.

The main objects of the invention are, therefore, to enable control of the wire melt off rate reasonably independent of the arc current and to obtain the required penetration in the base plate.

According to the present invention, a non-consumable electrode is mounted in close proximity to the sigma consumable electrode, and they are both connected in parallel to the same power supply or independently to separate power supplies. With separate power supplies the non-consumable electrode arc cam preheat the workpiece so as to attain better penetration and also maintain an arc independently of the sigma arc, so that the sigma wire may be fed at a rate to obtain desired weld bead height.

Figure 2:
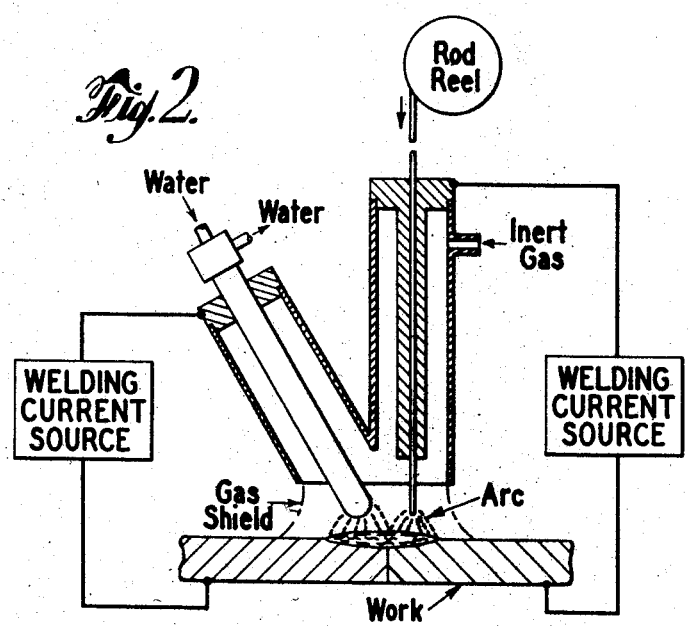

In the drawings:

Figure 1 is a diagram of apparatus in which the non-consumable electrode and the sigma electrode are electrically connected together; and Figure 2 is a diagram of apparatus for operating the two arcs with the same polarity from separate generators.

Control of the sigma wire feed rate can be achieved by connecting the non-consumable electrode and the sigma electrode directly together electrically as shown in Fig. 1. When this is done, arcs from each electrode do not exist simultaneously but alternate from one electrode to the other. However, the alternations are sufficiently rapid to appear as a co-existing arc.

The non-consumable electrode arc persists until the sigma wire contacts the workpiece. The total amount of current, now passing through the wire, melts the wire back until the sigma arc becomes too long, requiring an excessively high voltage for maintenance. The discharge then transfers to the non-consumable electrode. Essentially the duty-cycle of the sigma arc is variable under these conditions and is simultaneously controlled according to the demand of the wire drive.

Both tungsten pure or thoriated and water-cooled copper electrodes have been used as the non-consumable electrode; tungsten was used for direct current straight polarity operation, and water-cooled copper for reverse polarity. Both were useful in alternating current work. An example of the feed rate control in steel welding under stable operating conditions was obtained in a system in which the water-cooled copper electrode was in the leading position. Using 1/16 inch diameter No. 32 CMS welding wire at an arc current of 400 amperes direct current reverse polarity, the wire feed rate was varied from 0 to 200 inches per minute. The welding bead on steel plate was continuous and uniform with reinforcement dependent on wire feed rate.

Feed rate control and good welding results were also obtained with direct current straight polarity using a tungsten electrode, but metal spatter contaminated the electrode somewhat, producing some arc instability and contributing to electrode loss.

The reverse polarity operation with water-cooled electrodes is believed to be the more advantageous because of the inherently greater stability of the reverse polarity sigma arc and because argon containing a small proportion, say 5 percent of oxygen, can be advantageously employed without excessive attack of the water-cooled copper non-consumable electrode. The shielding gas can also contain other active gases, for example, carbon dioxide.

Bead shape control was achieved by operating the two arcs with the same polarity from separate generators. The non-consumable and sigma electrodes were introduced into a single cup in the manner illustrated in Fig. 2. This arrangement was used in direct current reverse polarity on steel. The non-consumable electrode was a water-cooled copper electrode mounted in the leading position with respect to the direction of travel. The 1/16 inch diameter No. 32 CMS wire burn-off rate and the bead penetration were characteristic of the sigma arc alone, and the bead width was equal to that of the non-consumable electrode arc alone. The combination of arcs produced a desirable increase in width to height ratio in the bead and effected better "fairing-out" at the edge of the bead. The apparatus was run with a 325 amp. direct current reverse polarity sigma arc and a 400 amp. direct current reverse polarity water-cooled electrode arc, in pure argon shielding, operated alone and concurrently.

The non-consumable electrode can also be used in the trailing or post-heat positions for certain welding conditions such as high linear speeds. In this arrangement there is more reliable striking of the non-consumable electrode arc after extinction of the consumable electrode arc.

The following table is a comparison between sigma, non-consumable electrode, and combination welding arcs:

| Process | Bead | | Bead Surface |
| --- | --- | --- | --- |
| | Penetration | Width/Height [1] | |
| Sigma | 0.10 | 3.3 | Irregular. |
| Water-cooled Copper | 0.02 | | |
| Non-consumable+Sigma | 0.09 | 5.9 | Satisfactory. |

[1] A ratio larger than 4 is desirable.

What is claimed is:

1. Method of gas shielded arc welding with tandem non-consumable and consumable electrodes shielded by a common stream of gas, which comprises alternately striking arcs between said respective electrodes and a workpiece, and moving said tandem electrodes and shielding gas stream along a line of weld.

2. Method of gas shielded arc welding which comprises striking an arc between a non-consumable electrode and a workpiece, passing a stream of shielding gas along the electrode to shield the arc, moving said gas shielded arc along a line of weld, and feeding a metal wire electrode through the gas stream adjacent said moving arc to contact the workpiece, whereby during the progress of said gas shielded tandem electrodes the current from the non-consumable electrode passes through the wire and melts back the wire until the length of the arc therefrom becomes excessive, whereupon the discharge transfers to the non-consumable electrode.

3. Method of gas shielded arc welding which comprises striking an arc between a non-consumable electrode and a workpiece, passing a stream of shielding gas along the electrode to shield the arc, moving said gas shielded arc along a line of weld, and feeding a metal wire electrode through said gas stream adjacent the rear of said moving arc to contact the workpiece, whereby during the progress of said gas shielded tandem electrodes the current from the leading non-consumable electrode passes through the wire and melts back the wire until the length of the arc therefrom becomes excessive, whereupon the discharge transfers to the leading non-consumable electrode.

4. Method of gas shielded arc welding with tandem non-consumable and consumable electrodes shielded by a common stream of gas which comprises alternately striking arcs of direct current reverse polarity from a single source of power between said respective electrodes and a workpiece, and moving said tandem electrodes and shielding gas stream along a line of weld.

5. Method of gas shielded arc welding with tandem non-consumable and consumable electrodes shielded by a common stream of gas which comprises alternately striking arcs of direct current straight polarity from a single source of power between said respective electrodes and a workpiece, and moving said tandem electrodes and shielding gas stream along a line of weld.

6. Method of gas shielded arc welding with tandem non-consumable and consumable electrodes shielded by a common stream of gas which comprises alternately striking arcs of alternating current from a single source of power between said respective electrodes and a workpiece, and moving said tandem electrodes and shielding gas stream along a line of weld.

7. Method of gas shielded arc welding with tandem tungsten and consumable electrodes shielded by a common stream of gas which comprises alternately striking arcs of direct current straight polarity from a single source of power between said respective electrodes and a workpiece, and moving said tandem electrodes and shielding gas stream along a line of weld.

8. Method of gas shielded arc welding with tandem water-cooled copper and consumable electrodes shielded by a common stream of gas which comprises alternately striking arcs of direct current reverse polarity from a single source of power between said respective electrodes and a workpiece, and moving said tandem electrodes and shielding gas stream along a line of weld.

9. Method of gas shielded arc welding with tandem water-cooled copper and consumable electrodes shielded by a common stream of gas containing at least a part oxygen, which comprises alternately striking arcs of direct current reverse polarity from a single source of power between said respective electrodes and a workpiece, and moving said tandem electrodes and shielding gas stream along a line of weld.

10. Method of gas shielded arc welding with tandem non-consumable and consumable electrodes shielded by a common stream of gas, which comprises concurrently striking arcs of direct current reverse polarity from separate sources of power between said respective electrodes and a workpiece, and moving said tandem electrodes and shielding gas stream along a line of weld.

11. Method of gas shielded arc welding with tandem non-consumable and consumable electrodes shielded by a common stream of gas, which comprises alternately striking arcs between said respective electrodes and a workpiece with the non-consumable electrode in the trailing position for more reliable reignition, and moving said tandem electrodes and shielding gas stream along a line of weld.

12. Method of gas shielded arc welding with tandem non-consumable and consumable electrodes shielded by a common stream of gas, which comprises concurrently striking arcs of direct current straight polarity from separate sources of power between said respective electrodes and a workpiece, and moving said tandem electrodes and shielding gas stream along a line of weld.

13. Method of gas shielded arc welding with tandem non-consumable and consumable electrodes shielded by a common stream of gas, which comprises concurrently striking arcs of alternating current from separate sources of power between said respective electrodes and a workpiece, and moving said tandem electrodes and shielding gas stream along a line of weld.

References Cited in the file of this patent

UNITED STATES PATENTS

| | | |
|---|---|---|
| 1,707,036 | Zack | Mar. 26, 1929 |
| 2,008,846 | Zack | July 23, 1935 |
| 2,121,693 | Henderson | June 21, 1938 |
| 2,360,160 | Pickhaver | Oct. 10, 1944 |
| 2,504,868 | Muller et al. | Apr. 18, 1950 |
| 2,791,673 | Arnaud | May 7, 1957 |
| 2,710,902 | Pilia | June 14, 1955 |

FOREIGN PATENTS

| | | |
|---|---|---|
| 619,373 | Great Britain | May 13, 1953 |